Figure 1:
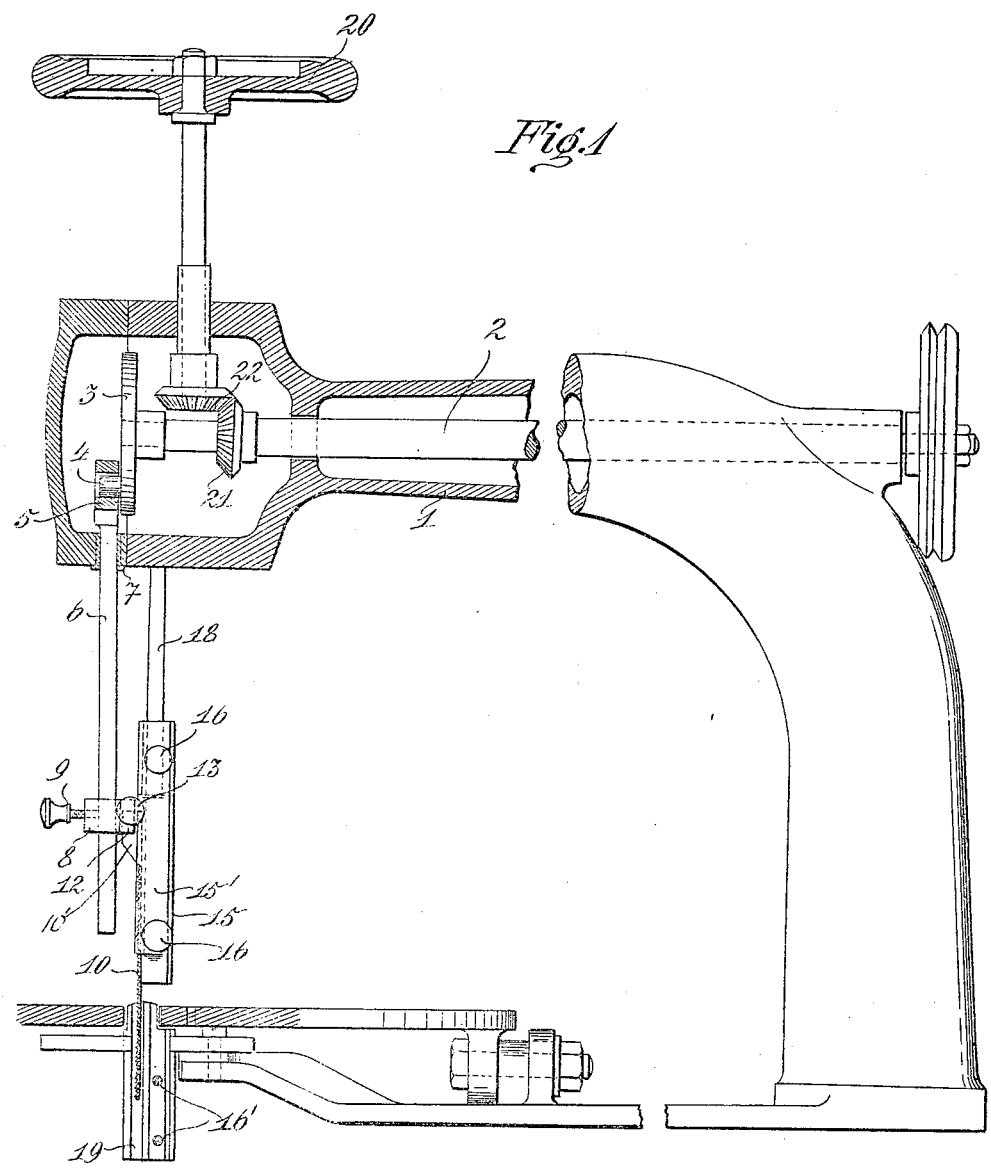

No. 824,328. PATENTED JUNE 26, 1906.
D. ALEMIAN.
SAWING MACHINE.
APPLICATION FILED DEC. 6, 1904.

2 SHEETS—SHEET 1.

WITNESSES
INVENTOR
Dikran Alemian
BY
ATTORNEYS.

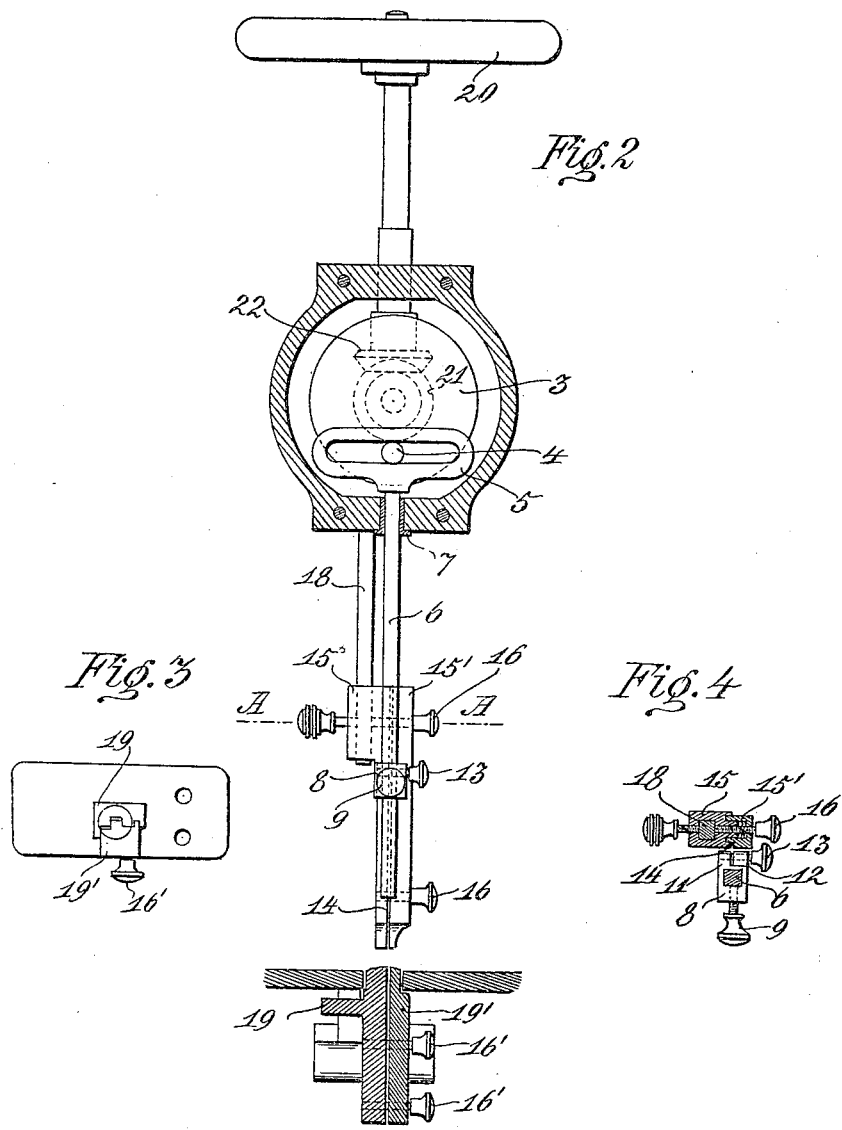

UNITED STATES PATENT OFFICE.

DIKRAN ALEMIAN, OF VIENNA, AUSTRIA-HUNGARY.

SAWING-MACHINE.

No. 824,328.      Specification of Letters Patent.      Patented June 26, 1906.

Application filed December 6, 1904. Serial No. 235,723.

*To all whom it may concern:*

Be it known that I, DIKRAN ALEMIAN, a subject of the Sultan of Turkey, residing at Vienna, in the Province of Lower Austria and Empire of Austria-Hungary, have invented new and useful Improvements in Sawing-Machines, of which the following is a specification.

This invention has for its object a sawing-machine for one or more saw-blades clamped at one side.

According to the invention each saw-blade is guided on its rear part and its sides in grooves which may be adjusted according to the thickness of the saw-blade and which are arranged above and below the work. Furthermore, each saw-blade is held in a clamping device mounted adjustable on a bar, which is reciprocated in suitable guides by any known mechanical means and has on its upper end a wide projection by means of which it may be clamped in the clamping device in such a manner that the rear of the saw-blade is exactly guided in the bottom of the guiding-grooves referred to above. This arrangement enables the guiding of each saw-blade exactly throughout its entire stroke and the raising or lowering of the saw-blade with the clamping device on the reciprocating bar, so that the work-piece may be inserted even at the lowest position of said reciprocating bar, and that, if required, blunt teeth of the operative portion of the saw-blade may be replaced by sharp teeth on the portions of the blade situated above or below it.

A piercing or fret sawing machine in accordance with this invention is illustrated, by way of example, in the accompanying drawings, in which—

Figure 1 is a side elevation of the same, partly in section. Fig. 2 is a front elevation, partly in section likewise. Fig. 3 is a plan view of the lower guide for the saw-blade, and Fig. 4 is a horizontal section through the upper guide on the line A A of Fig. 2.

In the frame-arm 1 of the machine is mounted a spindle 2, which is rotated by any suitable mechanical means. For example, a pulley mounted upon the one end of said spindle may be driven by means of a rope or strap from a treadle situated below the machine and not shown in the drawings. Upon the other end of said spindle 2 is keyed a crank-disk 3, the pin 4 of which engages in the slot of a connecting-link 5, fixed to a bar 6, which is vertically guided in the frame-arm 1 at 7. By this means the bar 6 is caused to reciprocate vertically when the spindle 2 is rotated. On said reciprocating bar 6 is mounted a clamping device 8, which is adjustable vertically upon this bar and adapted to be fixed at any desired height upon said bar by means of a set-screw 9. The saw-blade 10, or, if there are more, each of them, is provided on its upper end with a wide projection 10', said projection being on the same edge as the teeth, as shown in Fig. 1, in order to permit of clamping it in any desired position between the jaws 11 and 12 of the clamping device by means of the screw 13. The lower end of the saw-blade is smooth and rounded in order to facilitate its introduction into the hole previously bored for its reception in the work. The connection of the saw-blade 10 by means of the adjustable clamping device 8 with the reciprocating bar 6 enables to replace, if required, blunt teeth of the operative portion of the saw-blade by sharp teeth on the portions of the saw-blade situated above or below it by adjusting the clamping device 8 with its set-screw 9 in the desired height on the bar 6. In addition to this the clamping device, with the saw-blade, may also be arranged at such a height on the bar 6 that even in the lowest position of said reciprocating bar 6 the work may be inserted without being impeded by the saw-blade.

The saw-blade 10 is guided above the work by the three walls of a groove 14, which is formed by the two interengaging guide-pieces 15 and 15' and which is adjustable as to width in accordance with the thickness of the saw-blade by connecting-screws 16. A spring may be arranged around each screw 16, as indicated in Fig. 4, between the two guide-pieces 15 and 15'. In this adjustable guide the bottom of the groove constitutes the third guide-surface for the back of the saw, thereby obviating fracture of this latter, even in the case of exceedingly thin fret-saws, and also rendering it possible to dispense with complicated guides. This guide is vertically displaceable along a guide-bar 18, mounted in the arm 1 of the frame. A similar guide 19 19' in two parts and adjustable by means of screws 16' is also provided beneath the work-plate.

The wide projection on the upper end of the saw-blade 10 enables to clamp the saw-blade in the clamping device 8 in such a manner that the rear of the saw-blade is exactly guided on the bottom of the guiding-grooves.

A hand-wheel 20 may be connected with the spindle 2 by the intermediary of the gear-wheels 21 22. It acts as a fly-wheel and on starting the machine may be operated by hand.

In the case of sawing-machines with a number of blades the clamping device 8 and the guidings 15 15' and 19 19' are conveniently adapted for the reception of several saw-blades.

Having now described my invention, what I claim, and desire to secure by Letters Patent of the United States, is—

1. A sawing-machine comprising saw-blades having projections at their upper ends and on the same edge as the teeth, a reciprocating rod, adjustable clamps thereon engaging said projection and guides having adjustable grooves therein for guiding said blades on the rear and on the sides.

2. A sawing-machine comprising saw-blades having projections at their upper ends and on the same edge as the teeth, a reciprocating rod, adjustable clamps thereon engaging said projection, an upper guide having adjustable grooves for guiding said saw-blades above the work-piece and a lower guide having adjustable grooves for guiding said saw-blades at their free ends below the work-piece, substantially as described.

In testimony whereof I have signed my name to this specification in the presence of two subscribing witnesses.

DIKRAN ALEMIAN.

Witnesses:
HANS PAPPENHEIM,
ALVESTO S. HOGUE.